United States Patent [19]

Wright, Jr. et al.

[11] Patent Number: 5,716,057
[45] Date of Patent: Feb. 10, 1998

[54] TOOL HOLDING DEVICE INCORPORATING A SOLID FILM LUBRICANT

[75] Inventors: Leslie S. Wright, Jr., Charlotte, N.C.; Theodore G. Yaksich, Seneca, S.C.

[73] Assignee: Power Tool Holders, Incorporated, Wilmington, Del.

[21] Appl. No.: 730,631

[22] Filed: Dec. 3, 1996

Related U.S. Application Data

[63] Continuation of Ser. No. 472,253, Jun. 7, 1995, abandoned.

[51] Int. Cl.$^6$ .............................. B23B 31/12; B23B 31/20
[52] U.S. Cl. ..................... 279/62; 279/46.7; 279/123; 279/158
[58] Field of Search ............... 279/60–65, 46.1–46.7, 279/123, 158

[56] References Cited

U.S. PATENT DOCUMENTS

| | | | |
|---|---|---|---|
| 3,881,666 | 5/1975 | Greenhalgh | 242/68.2 |
| 5,186,478 | 2/1993 | Amyot . | |
| 5,322,303 | 6/1994 | Nakamura | 279/902 |
| 5,324,050 | 6/1994 | Kanaan | 279/46.7 |
| 5,405,155 | 4/1995 | Kanaan et al. . | |

FOREIGN PATENT DOCUMENTS

| | | | |
|---|---|---|---|
| 2650299 | 2/1991 | France . | |
| 3741549 | 6/1988 | Germany | 279/158 |
| 9507791 | 9/1993 | WIPO . | |
| 9427771 | 12/1994 | WIPO . | |

OTHER PUBLICATIONS

Japanese Abstract of Appllication No. 62-79932, Sep. 9, 1987 (1 page).

PCT International Search Report, Sep. 17, 1996, 4 pages.

*Primary Examiner*—Steven C. Bishop
*Attorney, Agent, or Firm*—Dority & Manning, P.A.

[57] ABSTRACT

An improved tool holding device has at least one tool engaging member for selectively engaging a tool during operation, such as the jaw blades of a chuck device and gripping jaw blades of a collet device. The tool holding device includes an actuating mechanism for causing the tool engaging members to selectively engage upon a tool. The actuating mechanism includes at least two components in frictional engagement. At least a portion of the frictional engaging components is coated with a solid film lubricant.

11 Claims, 4 Drawing Sheets

TOOL HOLDING DEVICE INCORPORATING A SOLID FILM LUBRICANT

This is a continuation of application Ser. No. 08/472,253, filed Jun. 7, 1995, which was abandoned upon the filing hereof.

BACKGROUND OF THE INVENTION

The present invention relates to an improved tool holding device, and more particularly to a tool holding device incorporating a solid film lubricant for enhancing the overall gripping strength and efficiency of such tool holding devices.

Tool holding devices are well known in the art for various applications. For example, such tool holding devices include chuck devices (both keyed and keyless) and collet devices (both split-steel collets and the Rubber-Flex® collet from Jacobs® Chuck Manufacturing Company). Tool holding devices also include fastening devices or mechanisms for attaching grinding discs, saw blades, and the like to drive spindles. These fastening devices may include conventional nuts, torque enhancing nuts, or similar mechanisms. The various applications and operation of conventional tool holding devices is well understood by those skilled in the art.

Many of these devices, such as keyed and keyless chucks and collets, work on a principle of sliding frictional engagement of actuation members to cause engaging members to grip a tool held in the device. The frictional interfaces are operationally unavoidable, but are the major contributor of wear and eventual degradation of such tool holding devices. The art is constantly striving to reduce the effects of friction with such devices so as to extend the life of the products. For example, it is known in the art to coat various components of such devices with zinc phosphate in an attempt to reduce friction between the components. Additionally, the components are typically packed with grease or other flowable type of lubricants in an attempt to reduce friction. However, although relatively effective at reducing friction, grease and oil present their own problems in that the grease/oil tends to collect dirt and abrasion particles and eventually leads to fouling of the devices. Additionally, grease/oil also presents a significant bleed-out problem.

Conventional lubricants such as oils and greases have also proved fairly limiting in higher pressure or increased load applications. Under normal loads, the oils and greases provide adequate separation between the metallic asperities in the surfaces of the frictionally engaging metallic members. However, under heavier loads, boundary lubrication occurs with typical oils and greases which results in contact of the asperities in the surfaces. The conventional dry lubricants, such as zinc phosphate, present a similar problem in that such lubricants are typically extremely thin at the contact areas of the asperities in the opposing surfaces and, thus, have relatively little lasting capacity over the life of the product.

Thus, applicants of the present invention set out to provide an improved tool holding device having significantly greater frictional wear characteristics and increased gripping torque than anything known or appreciated in the art.

OBJECTS AND SUMMARY OF THE INVENTION

It is therefore a principal object of the present invention to provide an improved tool holding device having frictional wear characteristics.

It is also an object of the present invention to provide a tool holding device having improved gripping torque or strength.

An additional object of the present invention is to provide an improved collet tool holding assembly.

And yet still another object of the present invention is to provide an improved chuck device.

Still another object of the present invention is to provide a method for increasing the wear characteristics and gripping torque or strength of any manner of tool holding devices.

Additional objects and advantages of the invention will be set forth in the following description, or may obvious from the description, or may be learned through practice of the invention.

Applicants have developed a significantly improved tool holding device incorporating a solid film lubricant coating on certain critical elements of the device, as well as an improved method of manufacturing a tool holding device. Applicants' present invention not only provides a tool holding device having improved wear characteristics, but also provides a device having significantly improved gripping strength or torque.

In accordance with the objects and purposes of the invention, an improved tool holding device is provided. The tool holding device includes at least one tool engaging member for selectively engaging a tool or tool shank during operation of the device. The improved tool holding device further includes an actuating mechanism for causing at least one of the tool engaging members to selectively engage upon the tool. The actuating mechanism includes at least two components in sliding frictional engagement. At least one portion of one of the components in frictional engagement is coated with a solid film lubricant. Preferably, the one component coated with the solid film lubricant is completely coated with the thickness of the coating being in the range of 0.0001 to 0.0005 inches thick. In a preferred embodiment, only one of the frictionally engaged components is coated with the solid film lubricant. In an alternative embodiment, at least a portion of both of the components are coated.

In a preferred embodiment of the invention, the tool holding device preferably comprises a chuck for use with a manual or powered driver. The chuck includes a generally cylindrical body member having a nose section and a tail section. The nose section has an axial bore formed therein to mate with the drive shaft of a driver and the nose section has an axial bore formed therein and a plurality of angularly disposed passageways formed therethrough which intersect the axial bore. A plurality of jaws are slidably positioned in each angularly disposed passageways. Each of the jaws has a jaw face formed on one side thereof and threads formed on the opposite side thereof. A nut is rotatably mounted on the body and is in engagement with the threads on the jaws. At least one of the nut or the threads on the jaws is at least partially coated with a solid film lubricant.

The chuck further includes a generally cylindrical sleeve member in driving engagement with the nut whereby the sleeve is rotated with respect to the body member. Preferably, only one of the surfaces of the nut or the threads on the jaws is coated with the solid film lubricant, and preferably coated completely with the lubricant. In an alternative embodiment, both of the surfaces may be coated with the lubricant. The thickness of the coating on either of the surfaces is in the range of approximately 0.0001 to 0.0005 inches.

In an alternative preferred embodiment of the improved tool holding device, a machine tool collet is provided which is actuated by engagement with a mating surface of a collet holder. In this embodiment, the tool engaging members include the plurality of gripping jaws in the collet, and particularly the inner diameter faces of the gripping jaws. The gripping jaws are held in a desired longitudinally and equally spaced angular position about the longitudinal centerline through the collet with resilient material disposed between the gripping jaws. The gripping jaw inner faces are parallel to the centerline axis and define an inner diameter opening for receipt of a tool shank. The actuating mechanism comprises the conical outer surface of the collet defined by the outer faces of the gripping jaws and a complimentary conical surface of the collet holder which engages the outer faces of the gripping jaws. At least one of the collet holder conical surface or the gripping jaw outer faces is coated with a solid film lubricant. In a preferred embodiment, only one of such a surfaces is coated. Alternatively, both of the surfaces may be coated.

The present invention also includes an improved method of manufacturing a tool holding device, such as a chuck or collet device. The method includes the steps of providing at least one tool engaging member for selectively engaging a tool during operation. For example, in the chuck embodiment, the tool engaging member includes the jaws movable in the plurality of angularly disposed passageways through the chuck body. In the collet embodiment, the engaging members include the plurality of gripping jaws, and particularly the inner faces of the gripping jaws.

The method according to the invention further includes providing an actuating mechanism for causing the tool engaging members to selectively engage upon the tool. The actuating mechanism includes at least two components in frictional engagement. For example, in the chuck embodiment, the members in frictional engagement include the threads on the rotatable nut and engaging threads defined on the movable jaws. In the collet embodiment, the components in frictional engagement include the conical outer surface of the collet defined by the outer faces of the gripping jaws and the complimentary conical surface of the collet holder.

The claimed method further includes coating at least one of the components which is in frictional engagement with a solid film lubricant. Preferably, only one of the components is coated. Alternatively, both of the components may be coated.

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
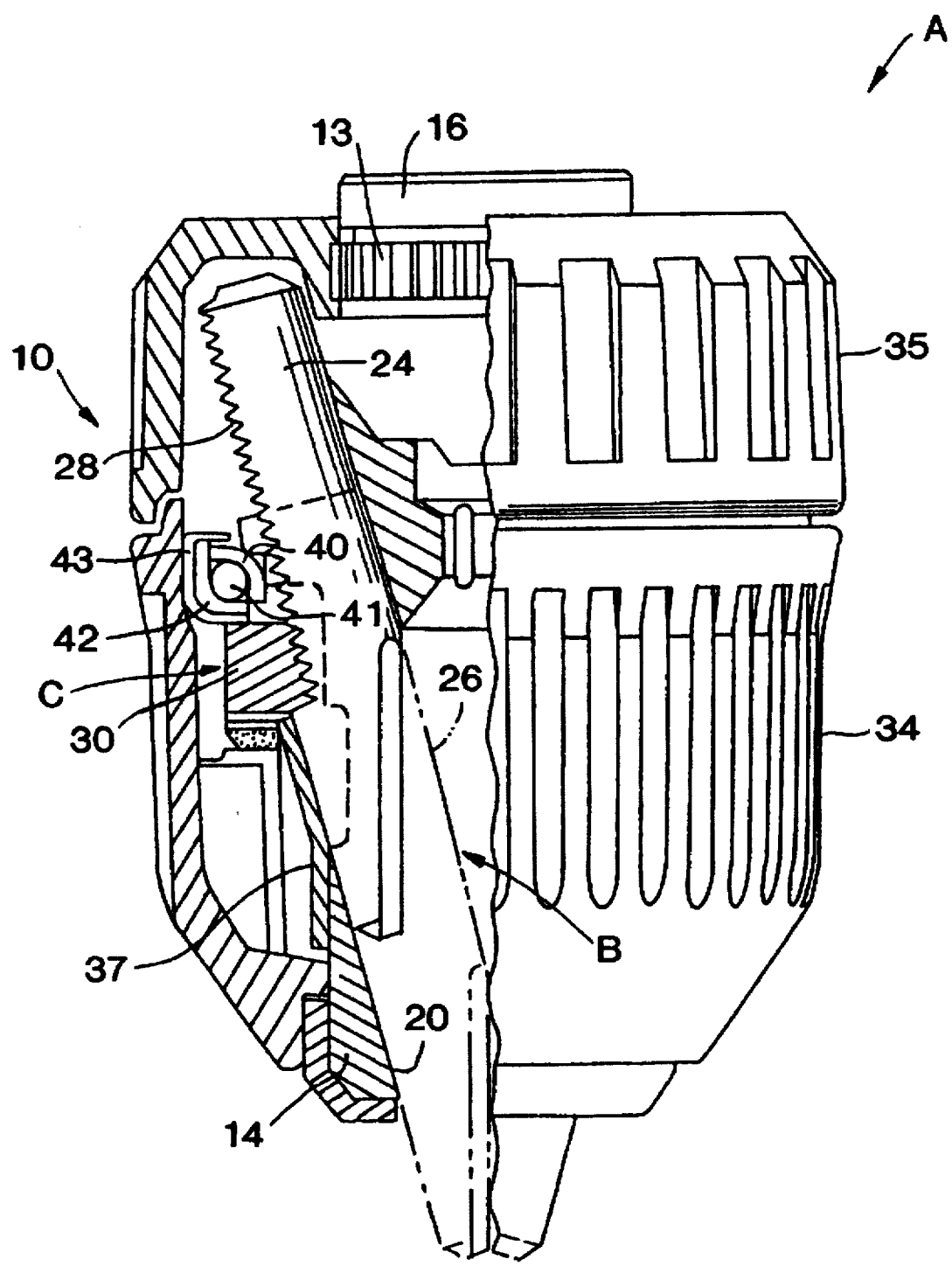
FIG. 1 is a partial cut-away perspective view of a chuck device embodiment of the improved tool holding device according to the invention.

Reference will now be made in detail to the presently preferred embodiments of the invention, one or more examples of which are illustrated in the accompanying drawings. Each example is provided by way of explanation of the invention, and not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The numbering of components in the drawings is consistent throughout the application, with the same components having the same number in each of the drawings.

The present invention relates to tool holding devices in general. Such devices may include keyed chucks, keyless chucks, all types of collets, quick release chuck devices, tapping attachment devices, nuts and torque enhancing devices for attaching saw blades or grinder discs to drive spindles, and any other manner of device or mechanism for attaching a tool with a driving member. The present invention will be explained and described by way of example through two preferred embodiments of the present invention, particularly a keyless chuck, and a collet system. However, it should be understood that this is in no means meant to limit the scope of the present invention. Any manner of tool holding device incorporating the essential features described herein is within the scope and spirit of the invention. Thus, any manner of tool holding device incorporating components in frictional engagement are included in the present invention.

As will be explained in detail below, the present invention includes the use of a solid film lubricant applied preferably as a coating to certain key frictional engaging components of the tool holding devices. A brief description of solid film lubricants is provided for ease in understanding in the present invention.

Solid film lubricants are also known as "dry film lubricants" or "bonded film lubricants." Solid film lubricants consist primarily of binders and pigments. Binders perform a carrier or anchoring function to hold the solid lubricating pigments in position and allow wear of the pigments through the life of the film. Thus, the binder and pigments maintains a lubricating matrix of dispersed solid particulate lubricating pigments through the entire life of the film. The binders consist primarily of resins such as phenols, alkyd, epoxy, and combinations thereof. Inorganic binders are also available and usually consist of silicate type materials. The curing times and temperatures for the solid film lubricants depend on the nature and type of binder utilized. The more successful and stable products contain binders that require baking to cure the film. However, air dry type of resin binders also exhibit excellent properties, especially if force cured at 130° Fahrenheit for twenty to thirty minutes.

The particulate pigments carried in the binders are chiefly of the molybdenum disulfide and graphite type. The most common combination is a 90% molybdenum disulfide in combination with 10% graphite.

Figure 3:
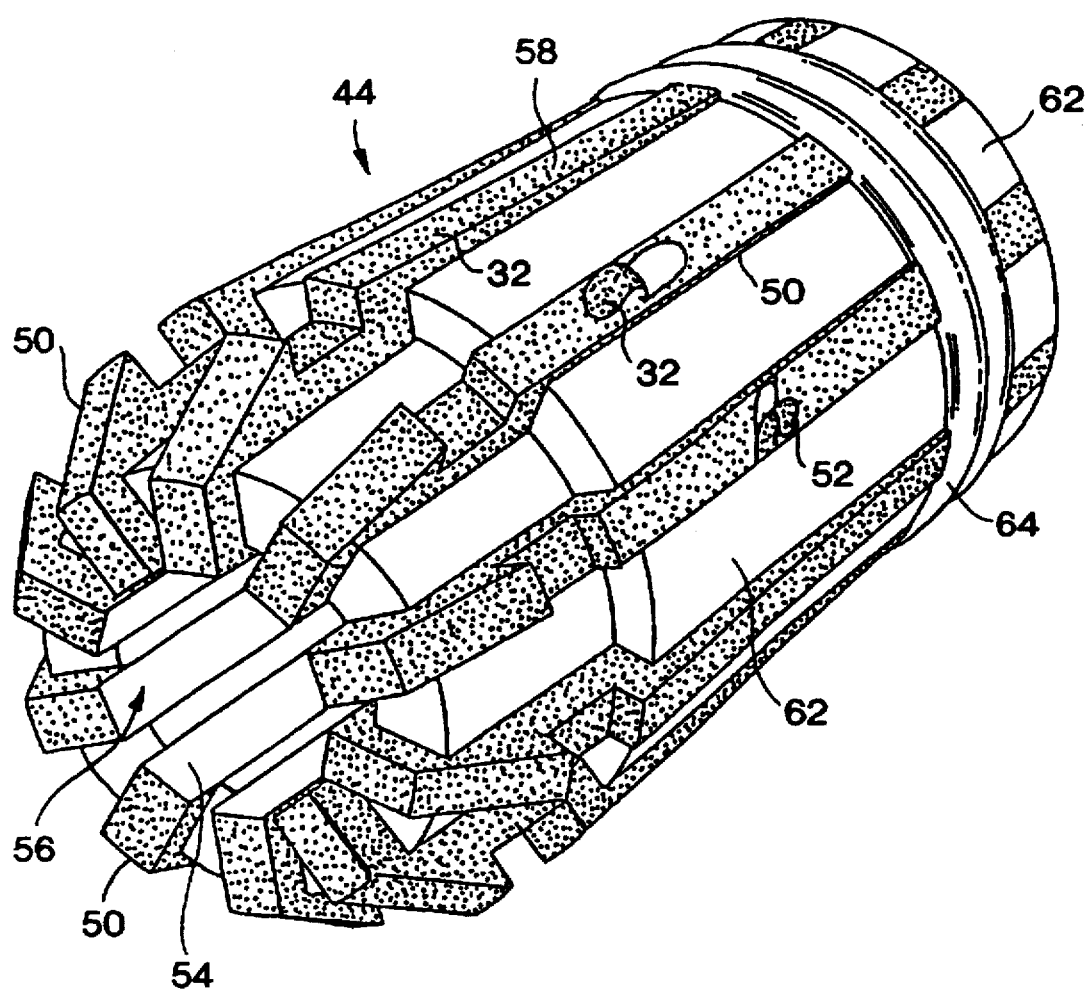
FIG. 3 is a perspective view of a collet according to the present invention.
Figure 4:
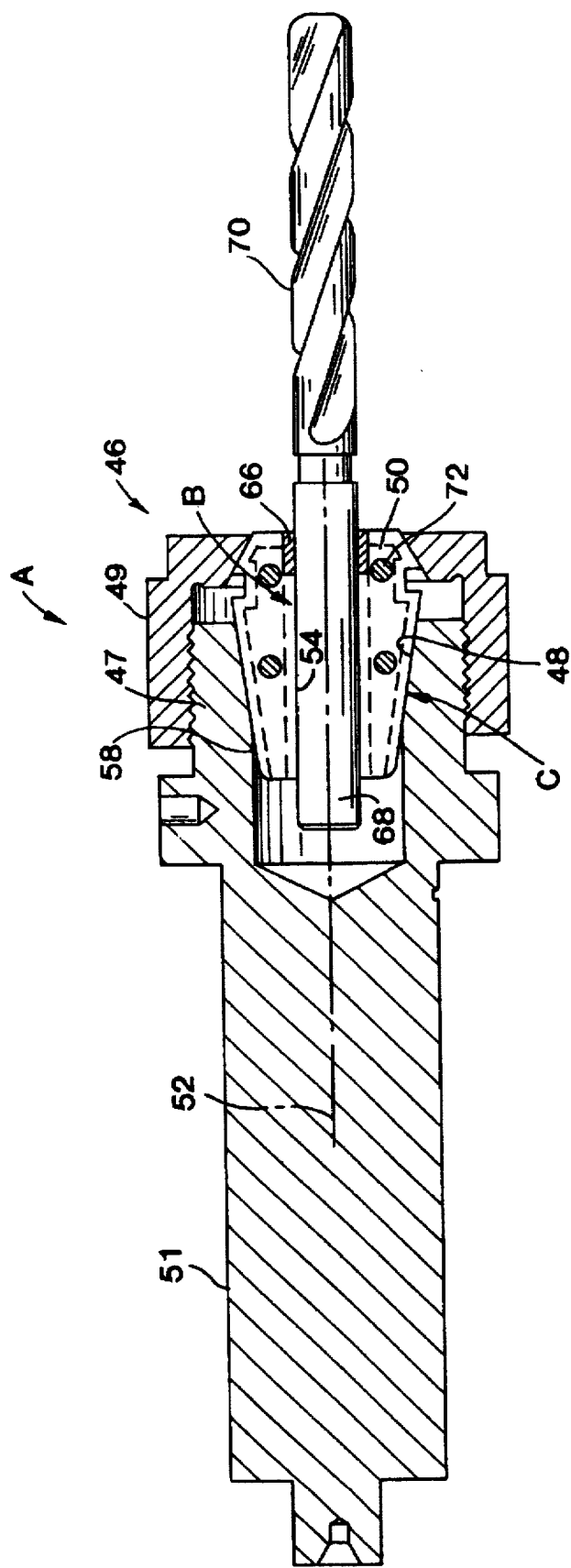
FIG. 4 is a cut-away side view of a collet and collet holder tool holding device according to the present invention.

Referring to FIGS. 1 and 4 in general, an improved tool holding device, designated generally as A, is depicted. Device A includes at least one tool engaging member, generally B, for selectively engaging a tool during operation, such as the drill bit 70 illustrated in FIG. 4. Tool holding device A also includes an actuating mechanism, generally C. Mechanism C causes the tool engaging member B to selectively engage upon the tool. As will be discussed in greater detail below in the description of the preferred embodiments, actuating mechanism C includes at least two components in frictional engagement. At least a portion of one of the components in frictional engagement is coated therewith a solid film lubricant, generally 32 in FIGS. 2 and 3.

Applicants have determined that the solid film lubricants as discussed above are preferred in tool holding device applications in that the lubricants resist adhesion of lint, dust, and corrosion products. The solid film lubricants are extremely adherent and will not bleed out internally from the tool holding devices as oil and grease does with conventional chucks.

Applicants have determined that a preferred cured film thickness for the components coated with the solid film lubricant is between 0.0001 and 0.0005 inches. The solid film lubricant coating is preferably applied by spraying the lubricant onto the components. Alternatively, the components may be dipped or spray tumbled.

The metallic surfaces of the actuating mechanism C in the present tool holding device A contain microscopic peaks and valleys or "asperities." The solid film lubricants are applied to the surfaces and cover the asperities with a solid film having a definite thickness of preferably between 0.0001 and 0.0005 per side coated. The coated surface slides either against a mating coated surface, or preferably against an uncoated surface. In the embodiment wherein only one of the frictional surfaces is coated, a thin film is transferred from the coated surface to the mating asperities in the uncoated surface.

Applicants have found that a preferred solid film lubricant for use with tool holding devices as described herein is PERMA-SLIK® by E/M® Corporation of West Lafayette, Ind. The PERMA-SLIK® lubricant is applied by dipping the components and curing at 130–140 degrees Fahrenheit for a period of eight to fifteen minutes. The PERMA-SLIK® solid film lubricant is but one of any number of solid film lubricants which may be applicable to the present invention.

Figure 2:
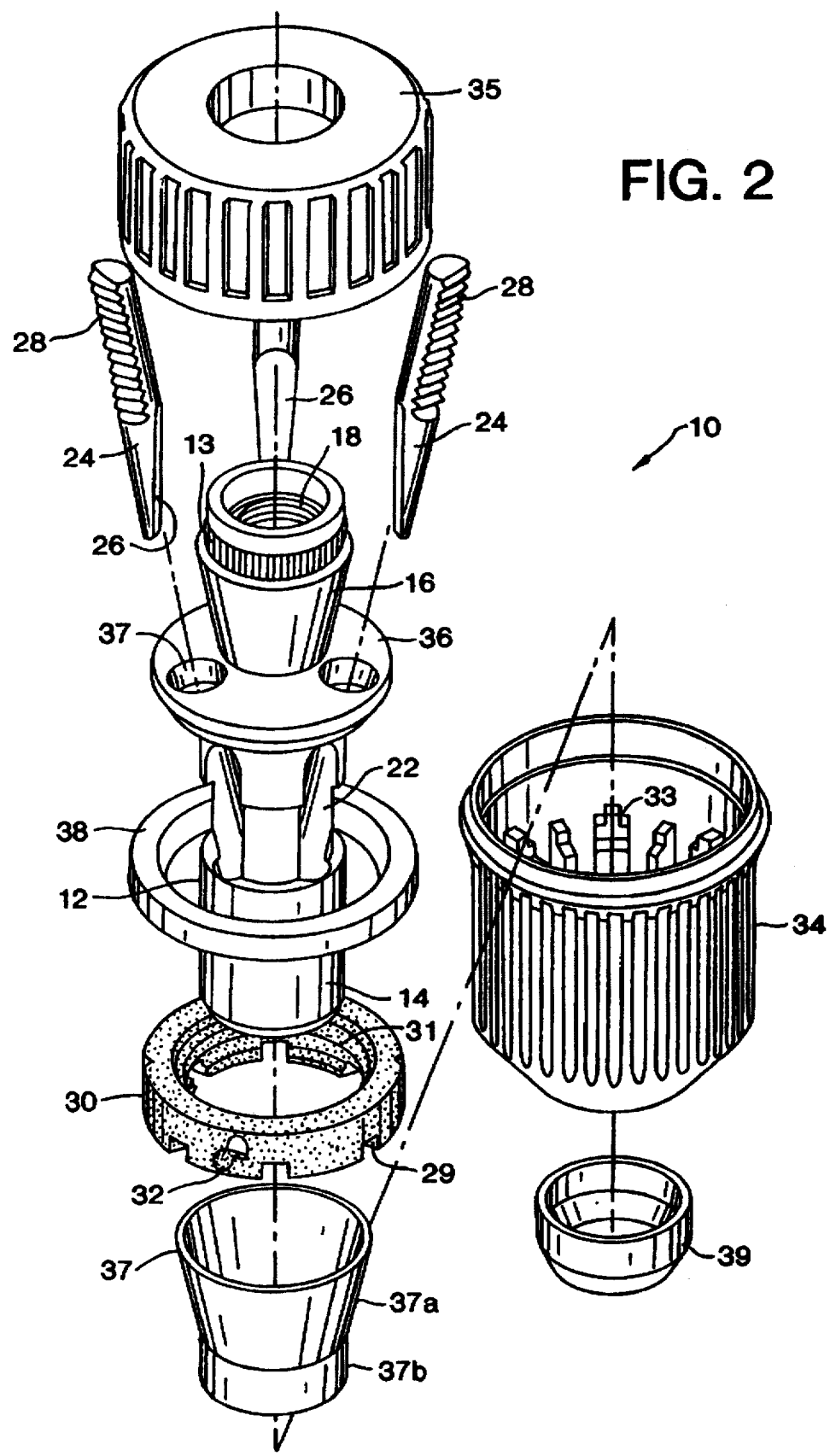
FIG. 2 is an in-line component view of the chuck device illustrated in FIG. 1.

A preferred embodiment of a tool holding device A according to the present invention is particularly illustrated in FIGS. 1 and 2. In this preferred embodiment, a keyless or hand operated chuck 10 is provided. Chuck 10 includes a front sleeve member 34, an optional rear sleeve member 35, a body member 12, and jaws 24. Body member 12 is generally cylindrical in shape and comprises a nose or forward section 14 and a tail or rearward section 16. An axial bore 20 is formed in the nose section 14 of the body member 12. Axial bore 20 is somewhat larger than the largest tool shank that the chuck is designed to accommodate. A threaded bore 18 is formed in tail section 16 of body 12 and is of a standard size to mate with the drive shaft of a powered or hand driver (not shown). The bores 20, 18 may communicate at the central region of the body member 12. While a threaded bore 18, is illustrated, such bore could be replaced with a tapered bore of a standard size to mate with a tapered drive shaft. Passageways 22 are formed in body member 12 to accommodate each jaw 24. Preferably, three jaws 24 are employed and each jaw 24 is separated from the adjacent jaw by an arc of approximately 120°. The axis of the passageways 22 and the jaws 24 are angled with respect to the chuck axis but intersect the chuck axis at a common point ahead of the chuck body 12. Each jaw 24 has a tool engaging face 26 which is generally parallel to the axis of the chuck body 12 and threads 28 on its opposite or outer surface. Threads 28 of any suitable type and pitch may be utilized within the scope of the present invention as would be readily apparent to one skilled in the art.

As illustrated in FIGS. 1 and 2, body member 12 may include a thrust ring member 36 which, in a preferred embodiment, is integral therewith. Thrust ring member 36 includes a plurality of jaw guide ways 37 formed around the circumference to permit retraction of the jaws 24 therethrough. Thrust ring member 36 may have an arcuate seating surface for receipt of a self-contained bearing assembly, as will be described.

Body member 12 includes a rear cylindrical portion with a knurled surface 13 formed thereon for receipt of optional rear sleeve 35 to be pressed thereon if so desired.

The present invention further includes a nut 30 which, in a preferred embodiment, is a unitary nut and which includes threads 31 for mating with threads 28 on jaws 24 whereby when the nut is rotated with respect to the body, the jaws will be advanced or retracted. As illustrated in FIG. 2, nut 30 includes drive slots 29 for mating with drive ribs 33 on front sleeve 34 so that when front sleeve 34 is rotated, nut 30 will rotate therewith and move jaws 24 as set forth above.

A self-contained bearing assembly 38 is adapted to be placed between thrust ring 36 and a face of nut 30. Self-contained bearing assembly 38 includes an inner race 40, an outer race 42, and bearing elements 41 maintained therebetween. In a preferred embodiment, bearing elements 41 are ball bearings. Self-contained bearing assembly 38 may further include a shroud 43 surrounding the inner and outer races for maintaining the bearing assembly as a self-contained component. In a preferred embodiment, self-contained bearing assembly 38 is a radial thrust bearing. It should be appreciated that any type bearing arrangement, including plain bearing surfaces, could be utilized in the present invention.

Referring again to FIGS. 1 and 2, a nut retainer member is generally illustrated as 37. Nut retainer member 37 includes a first generally cylindrical portion 37b and a second frusto-conical portion 37a. Substantially cylindrical portion 37b in configured to be press-fitted over nose or forward section 14 in a location so that a portion thereof will engage nut 30 to prevent nut 30 from moving axially forward more than a desired amount. This desired amount can be determined by the location in which the nut retainer member is press-fitted to the body member. It should be appreciated that the nut retainer member is adapted to be press-fitted onto the nose portion of the body, but could be secured in any other suitable manner in accordance with the present invention.

Front sleeve member 34 is adapted to be loosely fitted over nose section 14 of chuck 10. Drive ribs 33 of front sleeve 34 engage drive slots 29 of nut 30 so that front sleeve 34 and nut 30 will be operatively rotational connected, i.e., when front sleeve 34 is rotated, nut 30 will rotate therewith.

A nose piece 39 is dimensioned and adapted to be pressed onto the front of the forward section 14 of body member 12 to maintain front sleeve 34 on chuck 10. It should be appreciated that nose piece 39 could also be secured by snap fit, threading, or the like. Nose piece 39 is exposed when the chuck is assembled and is preferably coated with a non-ferrous metallic coating to prevent rust and to enhance its appearance. In a preferred embodiment, such coating may be zinc or nickel, however, it should be appreciated that any suitable coating could be utilized.

Nose piece 39 serves to maintain front sleeve member 34 in position on chuck 10 and in driving engagement with nut 30. In addition, nose piece 39 serves the dual purpose of providing an aesthetically pleasing cover for the nose portion that inhibits rust. This provides the advantage of an aesthetically pleasing appearance without the necessity to coat the entire body member 12 with a non-ferrous material.

If desired, the rear sleeve member 35 may be omitted and the front sleeve member 34 extended to the tail end of body 12. This alternative is feasible with a spindle lock or the like is provided on the driver or when the driver is used to tighten or loosen the jaws.

It should be appreciated that a snap ring or any other mechanism could be utilized to maintain front sleeve 34 in place in lieu of nose piece 39.

The circumferential surface of the front sleeve member 34 may be knurled or may be provided with longitudinal ribs or other protrusions to enable the operator to grip it securely. In like manner, the circumferential surface of the rear sleeve member 35, if employed, may be knurled or ribbed if desired. The front and rear sleeves may be fabricated from a structural plastic such as polycarbonate, a filled polypropelene, for example, glass filled polypropelene, or a blend of structural plastic materials. Other composite materials such as, for example, graphite filled polymerics would also be suitable in certain environments. As will be appreciated by one skilled in the art, the materials from which the chuck of the present invention is fabricated will depend on the end use of the chuck, and the above are provided by of example only.

It will be further appreciated that rear sleeve member 35 is fixed to body member 12 while front sleeve member 34 is operatively associated with nut 30 and secured to body member 12 for relative rotation therewith. Relative movement of the front and rear sleeve members due to the interaction between threads 28 on jaws 24 and threads 31 on nut 30 causes jaws 24 to be advanced or retracted, depending upon the direction of relative movement.

At least one of the surfaces of the frictional interface between nut 30 and jaw threads 28 is coated with a solid film lubricant as described above. In the embodiment illustrated, solid film lubricant 32 completely coats nut 30. It is preferred that the lubricant coat any part of nut 30 that is subject to frictional engagement with other components of the device. However, for ease of coating, the entire nut 30 is simply sprayed or dipped in solid film lubricant 32.

In an alternative embodiment not illustrated, solid film lubricant 32 may be applied as a coating to jaws 24, and particularly to jaw threads 28.

Applicant has determined that it is preferred to only coat one of the frictional engaging surfaces of nut 30 and jaws 24. For example, it is preferred that either nut 30 (at least threads 31) is coated with solid film lubricant 32 while jaws 24 remain uncoated. Alternatively, jaws 24 may be coated while nut 30 remains uncoated. It is also within the scope of the invention to coat both frictionally engaging surfaces of nut 30 and jaws 24.

FIGS. 3 and 4 illustrate another preferred embodiment of an improved tool holding device A according to the present invention particularly relating to a collet and collet holder system. Referring particularly to FIG. 4, a collet holder 46 is illustrated. Collet holder 46 includes a body member 47 having a frusto-conical inner diameter surface 48 defined therein. Body member 47 includes a longitudinally extending stem portion 51 which is matable to a drive spindle (not shown). In an alternative embodiment, stem 51 may comprise the drive spindle itself.

A collet 44 is received within the body 47 of collet holder 46, as commonly understood by those skilled in the art. The arbor end of collet holder 46 includes a threaded outer diameter as illustrated. A nut member 49 is provided having a threaded inner diameter for threaded engagement with the arbor end of body 47.

The device illustrated in FIG. 4 operates by placing a collet 44 within the frusto-conical recess defined in body member 47 and subsequently screwing nut 49 onto the arbor end. As nut 49 is moved axially through threaded rotational engagement, it forces collet 44 to compress and grip shaft 66 of tool 70 held within the inner diameter opening of the collet. Thus, a frictional interface exists between the outer diameter frusto-conical surface of collet 44 and the inner diameter frusto-conical surface of body member 47 of collet holder 46.

According to the invention, at least one of the frictional interface surfaces, frusto-conical surface 48 of body member 47 or frusto-conical outer diameter surface 58 of collet 44, is coated with a solid film lubricant as described above. It is preferred that only one of the surfaces is coated and preferably within the range of 0.0001 and 0.0005 inches. Alternatively, both such surfaces could be coated.

FIG. 3 depicts a preferred embodiment of a collet according to the invention incorporating a solid film lubricant as discussed above. FIG. 3 illustrates a type of collet widely recognized in the art as a Rubber-Flex® collet from Jacobs® Chuck Manufacturing Company.

Collet 44 includes a plurality of gripping jaws 50 held in a desired spaced relation relative to each other and the longitudinal centerline 52 (FIG. 4) through collet 44. Gripping jaws 50 are held in place by resilient material 62 disposed between each gripping jaw. Material 62 also preferably extends through perforations 72 defined through gripping jaws 50 so as to form essentially concentric rings of resilient material 62 through gripping jaws 50.

Gripping jaws 50 are disposed around longitudinal centerline 52 such that inner faces 54 of jaws 50 define an inner diameter opening 56 for receipt of a tool shank 68, as illustrated in FIG. 4. Jaws 50 also include an angled exposed outer face 58 whereby the plurality of jaws 50 define an essentially frusto-conical shaped outer diameter surface which compliments the frusto-conical receiving surface 48 of the body 47 of collet holder 46. As depicted in FIG. 3, resilient material 62 may be defined generally below the exposed outer faces 58 of jaws 50. In an alternative preferred embodiment not illustrated, resilient material 62 may be generally flush with the outer exposed faces 58 of jaws 50. Compression recesses (not shown) may also be defined in resilient material 62 between jaw blades 50 to allow for greater compression of collet 44 within its respective mating collet holder 46. The necessity of compression recesses is dependent upon the resiliency and/or volume of resilient material disposed between the respective gripping jaws.

In many applications of collets 44, it is highly desirable to conduct a coolant fluid through the collet 44 and collet holder 46. In this regard, collet 44 preferably includes a continuous outer diameter seal, as illustrated in FIG. 3. Outer seal 64 is formed preferably integral with resilient material 62, and preferably is formed of the same material as resilient material 62. In this manner, outer seal 64 is molded integral with resilient material 62. In a preferred embodiment of the invention, outer seal 62 comprises a double-lip seal, as indicated in FIG. 3. In an alternative embodiment, seal 64 may comprise a single lip.

Collet 44 also preferably includes a continuous inner diameter seal 66, as illustrated in FIG. 4. The inner diameter seal is not illustrated in FIG. 3 so as to indicate that the inner faces 54 of jaws 50 are not coated with solid film lubricant 32. Inner diameter seal 66 is also preferably formed integral with resilient material 62 and, preferably, also comprises a double-lip seal. Again, this double-lip seal is also preferably molded integral with resilient material 62.

The design and operation of the continuous inner and outer diameter seals of the present inventive collet are discussed extensively in U.S. Pat. No. 5,324,050, which is herein incorporated by reference.

Additionally, means for conducting coolant fluid through the collet, particularly through longitudinal channels defined within the collet is described in U.S. Pat. No. 4,405,155, which is also incorporated herein by reference.

Referring particularly to FIG. 3, collet 44 includes a coating 32 of solid film lubricant on at least the outer exposed faces 58 of jaw blades 50. For ease of applying coating 32, the coating may be applied to the other surfaces of jaw blades 50 as well, except for inner faces 54 which engage tool shank 68.

The thickness of film 32 applied to the outer faces 58 of jaws 50 is preferably within the range of 0.0001 and 0.0005 inches.

The present inventive tool holding device has been described primarily by reference to a chuck device and collet system. However, this is not meant to limit the invention in any way. The present invention is applicable to any manner of tool holding devices wherein an actuating mechanism comprises frictionally engaging metallic surfaces. Thus, it will be apparent to those skilled in the art that various modifications and variations can be made in the present apparatus without departing from the scope or spirit of the invention. It is intended that the present invention cover the modifications and variations of this invention provided within the scope of their appended claims and their equivalents.

What is claimed is:

1. A chuck for use with a manual or powered driver having a rotatable drive shaft, said chuck comprising:

a) a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;

b) a plurality of jaws slidably positioned in each of said angularly disposed passageways, each of said jaws having a jaw face formed on one side thereof and threads formed on the opposite side thereof;

c) a nut rotatably mounted on said body and in engagement with said threads on said jaws, at least one of said nut or said threads on said jaws being at least partially coated with a solid film lubricant at an area of engagement between said nut and said threads; and d) a generally cylindrical sleeve member in driving engagement with said nut whereby when said sleeve member is rotated with respect to said body member, said jaws will be moved thereby.

2. A chuck for use with a manual or powered driver as set forth in claim 1, wherein said body includes a thrust ring.

3. A chuck for use with a manual or powered driver as set forth in claim 2, and further including a bearing member located between said nut and said thrust ring.

4. A chuck for use with a manual or powered driver as set forth in claim 1, wherein the at least one of the nut or threads on said jaws is completely coated by said solid film lubricant.

5. A chuck for use with a manual or powered driver as set forth in claim 1, wherein both said nut and said threads on said jaws are coated with said solid film lubricant at said area of engagement.

6. A chuck for use with a manual or powered driver as set forth in claim 1, wherein the thickness of said coating is in the range of approximately 0.0001 to 0.0005 inches.

7. An improved method of manufacturing a chuck for use with a manual or powered driver having a rotatable drive shaft, said method comprising the steps of:

providing a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;

providing a plurality of jaws configured to be slidably positioned in each of said angularly disposed passageways, each of said jaws having a jaw face formed on one side thereof and threads formed on the opposite side thereof;

providing a nut configured to be rotatably mounted on said body and in engagement with said threads on said jaws; and coating at least one of said nut or said threads on said jaws with a solid film lubricant at an area of engagement between said nut and said threads.

8. An improved method of manufacturing a chuck as set forth in claim 7, wherein said coating is applied to one of said nut or said threads by spraying.

9. An improved method of manufacturing a chuck as set forth in claim 7, wherein said coating is applied to one of said nut and said threads by dipping.

10. An improved method of manufacturing a chuck as set forth in claim 7, and further including the step of preparing the surface to be coated prior to applying said coating.

11. An improved method of manufacturing a chuck as set forth in claim 7, wherein said coating is applied to a thickness of approximately in the range of 0.0001 to 0.0005 inches thick.

* * * * *